United States Patent
Coronato et al.

(10) Patent No.: US 9,151,611 B2
(45) Date of Patent: Oct. 6, 2015

(54) MICRO RATE OF ROTATION SENSOR AND METHOD FOR OPERATING A MICRO RATE OF ROTATION SENSOR

(71) Applicant: Maxim Integrated Products, Inc., San Jose, CA (US)

(72) Inventors: Luca Coronato, Corsico (IT); Gabriele Cazzaniga, Rosate (IT)

(73) Assignee: Maxim Integrated Products, Inc., San Jose, CA (US)

( * ) Notice: Subject to any disclaimer, the term of this patent is extended or adjusted under 35 U.S.C. 154(b) by 339 days.

(21) Appl. No.: 13/720,426

(22) Filed: Dec. 19, 2012

(65) Prior Publication Data

US 2013/0167636 A1    Jul. 4, 2013

(30) Foreign Application Priority Data

Dec. 28, 2011    (DE) .................... 10 2011 057 081

(51) Int. Cl.
*G01C 19/56*    (2012.01)
*G01C 19/42*    (2006.01)
*G01C 19/5719*    (2012.01)
(Continued)

(52) U.S. Cl.
CPC ............ *G01C 19/42* (2013.01); *G01C 19/5642* (2013.01); *G01C 19/5719* (2013.01); *G01C 19/5747* (2013.01)

(58) Field of Classification Search
CPC .............. G01C 19/5719; G01C 19/56; G01C 19/5607; G01C 19/5649; G01C 19/5642; G01C 19/5663; G01C 19/5635

USPC ................ 73/504.12, 504.14, 504.04, 504.02
See application file for complete search history.

(56) References Cited

U.S. PATENT DOCUMENTS

| 5,767,405 | A | 6/1998 | Bernstein et al. |
| 5,955,668 | A | 9/1999 | Hsu et al. |
| 6,308,567 | B1 | 10/2001 | Higuchi et al. |

(Continued)

FOREIGN PATENT DOCUMENTS

| DE | 102007054505 A1 | 5/2009 |
| DE | 102008002748 A1 | 12/2009 |

(Continued)

OTHER PUBLICATIONS

German Search Report for Co-Pending German Application No. 110 2011 057 081.0, mailed on May 7, 2012.

(Continued)

*Primary Examiner* — Helen Kwok
(74) *Attorney, Agent, or Firm* — North Weber & Baugh LLP

(57) ABSTRACT

The present invention relates to a method for operating a rotation sensor for detecting a plurality of rates of rotation about orthogonal axes (x,y,z). The rotation sensor comprises a substrate, driving masses, X-Y sensor masses, and Z sensor masses. The driving masses are driven by drive elements to oscillate in the X-direction. The X-Y sensor masses are coupled to the driving masses, and driven to oscillate in the X-Y direction radially to a center. When a rate of rotation of the substrate occurs about the X-axis or the Y-axis, the X-Y sensor masses are jointly deflected about the Y-axis or X-axis. When a rate of rotation of the substrate occurs about the Z-axis, the X-Y sensor masses are rotated about the Z-axis, and the Z sensor masses are deflected substantially in the X-direction.

18 Claims, 3 Drawing Sheets

(51) Int. Cl.
*G01C 19/5642* (2012.01)
*G01C 19/5747* (2012.01)

(56) References Cited

U.S. PATENT DOCUMENTS

| | | | |
|---|---|---|---|
| 7,513,155 B2* | 4/2009 | Jeong et al. | 73/504.02 |
| 8,171,792 B2* | 5/2012 | Sameshima | 73/504.04 |
| 8,429,970 B2* | 4/2013 | Rocchi | 73/504.08 |
| 8,459,093 B2* | 6/2013 | Donadel et al. | 73/1.37 |
| 8,479,575 B2* | 7/2013 | Kempe | 73/504.12 |
| 8,534,127 B2* | 9/2013 | Seeger et al. | 73/504.12 |
| 8,776,599 B2* | 7/2014 | Hammer | 73/504.02 |
| 8,789,416 B2* | 7/2014 | Rocchi | 73/504.12 |
| 8,904,866 B2* | 12/2014 | Hammer | 73/504.12 |
| 2010/0236327 A1* | 9/2010 | Mao | 73/504.12 |
| 2011/0061460 A1 | 3/2011 | Seeger et al. | |
| 2011/0303007 A1 | 12/2011 | Rocchi | |
| 2012/0060604 A1* | 3/2012 | Neul et al. | 73/504.12 |
| 2013/0031977 A1* | 2/2013 | Kempe | 73/504.04 |
| 2013/0239679 A1* | 9/2013 | Kornilovich | 73/504.12 |

FOREIGN PATENT DOCUMENTS

| | | |
|---|---|---|
| DE | 102009001248 A1 | 9/2010 |
| DE | 102009001922 A1 | 9/2010 |
| DE | 102010028005 A1 | 10/2011 |
| EP | 2339293 A1 | 6/2011 |
| JP | 2010210407 A | 9/2010 |
| WO | 2009078284 A1 | 6/2009 |

OTHER PUBLICATIONS

Office Action dated May 19, 2015, in related EP Application No. 12197114.7 (9pgs).

* cited by examiner

MICRO RATE OF ROTATION SENSOR AND METHOD FOR OPERATING A MICRO RATE OF ROTATION SENSOR

CROSS REFERENCE TO RELATED APPLICATIONS

The application claims the benefit of German Application Serial No. 10 2011 057 081.0, entitled "Micro Rate of Rotation Sensor and Method for Operating a Micro Rate of Rotation Sensor", filed on Dec. 28, 2011, the subject matter of which is incorporated herein by reference.

BACKGROUND

A. Technical Field

The present invention relates to a micro rate of rotation sensor for detecting a plurality of rates of rotation about orthogonal axes x, y, and z, having a substrate, having a plurality of masses disposed in an X-Y plane parallel to the substrate and displaceable relative to the substrate, having a plurality of anchors for attaching the masses to the substrate, having springs for connecting at least some of the masses to at least one adjacent mass or to at least one anchor, having drive elements for oscillating at least some of the masses in the X-direction in order to generate Coriolis forces when the substrate is deflected, and having sensor elements for detecting deflections of the masses due to the Coriolis forces generated, and a method for operating a micro rate of rotation sensor for detecting a plurality of rates of rotation about orthogonal axes x, y, and z, having a substrate and driving masses, X-Y sensor masses, and Z sensor masses.

B. Background of the Invention

A generic micro rate of rotation sensor using MEMS technology is known from U.S. Pat. No. 6,308,567 B1, wherein driving masses are driven to oscillate. When a rate of rotation about one of the three orthogonal X, Y, or Z-axes occurs, masses are deflected out of the drive plane or rotated about the Z-axis. Sensor elements are associated with the masses in order to be able to detect the deflections. The deflections occur on the basis of Coriolis forces acting on the masses in case of a corresponding rotary motion and displacing the masses in the corresponding direction. In the embodiment example shown in said publication, the masses are driven toward a center and are rotated about an X-axis, a Y-axis, or a Z-axis due to the Coriolis forces. Sensor elements associated with said masses detect the corresponding rotary motion by means of electrical signals that occur by changing the spacing of fixed electrodes and displaceable electrodes. The signal change provides information about the rate of rotation that acted on the sensor.

A disadvantage of said embodiment is that such a sensor is very sensitive to external force effects, which can cause false measurements. The sensor shown also requires a large area on the substrate. The sensor is also sensitive to temperature, because deformation of the individual elements due to temperature effects can slightly falsify the results.

SUMMARY OF THE INVENTION

The object of the present invention is thus to provide an MEMS rate of rotation sensor having a low space requirements, being very stable with respect to external forces and temperature effects, and nevertheless comprising very high measurement accuracy.

The object is achieved by a micro rate of rotation sensor and a method for operating such a micro rate of rotation sensor having the characteristics of the independent claims.

A micro rate of rotation sensor according to the invention serves for detecting a plurality of rate of rotation about orthogonal axes x, y, and/or z. The sensor has a substrate and a plurality of masses displaceable relative to the substrate and disposed in an X-Y plane parallel to the substrate. A plurality of anchors are also provided for attaching the masses to the substrate. At least some of the masses are attached to at least one adjacent mass or to at least one anchor by means of springs. At least some of the masses have drive elements in order to excite said masses to oscillate in the X-direction, so that Coriolis forces act on the masses in case of a deflection of the substrate. The deflections of the masses due to the Coriolis forces generated are detected by means of sensor elements. According to the invention, the masses are divided into driving masses, X-Y sensor masses, or Z sensor masses. The X-Y sensor masses are connected to the driving masses and the Z sensor masses by means of springs. The connection between the X-Y sensor masses and the driving masses (11) is such that when the driving masses are driven to oscillate in the X-direction, the X-Y sensor masses are driven to oscillate in the X-Y direction by means of the driving masses. The X-Y sensor masses thus typically do not require a dedicated drive, rather, they are indirectly driven by the driving masses. While the driving masses are displaced in the X-direction, said masses are coupled to the X-Y sensor masses to the X-Y sensor masses are coupled support on the substrate by means of springs and anchors, such that the X-Y sensor masses are not driven in the X-direction, but in a direction between the X-axis and the Y-axis. An angular offset between the driving mass and the oscillating X-Y sensor mass is thus present. The active drive of the driving mass can take place very simply and using little space in the X-direction, while active drives are not required for the X-Y sensor masses. A space-saving construction of the sensor can thus be provided, and indirectly driven driving masses obtained in the form of the X-Y sensor masses that do not oscillate exclusively in the X-direction, but in a direction diagonal to the X-axis. Coriolis forces arise thereby, bringing about a rotation of the X-Y sensor masses as a function of the rate of rotation of the substrate about the X-axis and/or the Y-axis, among other causes. It is also ensured that the X-Y sensor masses can be very stably supported, just as the driving masses are. External influences on the substrate or the micro rate of rotation sensor, such as in the form of impacts, can thereby be absorbed very well. The risk that the individual masses, the substrate, or the springs are damaged, or that the masses and the substrate come into contact with each other and thus cause short circuits, is thereby very low.

The stable support of the individual masses also ensures that temperature has no or very little effect on the measurement results. Deformation of the individual masses, particularly the X-Y sensor masses or Z sensor masses, due to such temperature effects is largely prevented by the stable support, because deformation of, and thus changes in the spacing between, the masses and the substrate will hardly occur.

Because the X-Y sensor masses are no longer connected to the driving masses in order to perform such a drive motion, but are rather additionally connected to the Z sensor masses by means of springs, Coriolis forces are also generated in case of a rate of rotation about the Z-axis, causing the X-Y sensor masses and the Z sensor masses to oscillate in rotation about the Z-axis. The low sensitivity of the micro rate of rotation sensor also makes the measurement accuracy correspondingly high. In addition, only a small space is required on the substrate.

According to an advantageous embodiment of the invention, the drive direction of the X-Y sensor masses is between the X-axis and the Y-axis, preferably at an angle of 45° to the X-axis. Said offset drive direction of the X-Y sensor masses with respect to the driving masses generates a torque on the individual masses of the rate of rotation sensor about the X-axis, Y-axis, and Z-axis, due to Coriolis forces. If the X-Y sensor masses are driven at an angle of 45° to the X-axis, then the forces acting thereon are approximately equal in magnitude, so that identical deflections and equal force transfers to adjacent masses are expected.

The X-Y sensor masses are preferably driven to oscillate radially to a center by the driving mass oscillating in the X-direction. The result is a very compact construction of the rate of rotation sensor, having equal forces and torques about all axes. Alternatively, it is also possible and can be advantageous for the X-Y sensor masses to be driven to oscillate offset to a center. The magnitudes of torques inducing a rotation about one axis or another can thereby be influenced, for example. Depending on the individual design of the rate of rotation sensor, this can be advantageous.

In a particularly advantageous embodiment of the invention, an elastic suspension is disposed between the X-Y sensor masses and the central suspension or a central anchor. The elastic suspension can be in the form of a gimbal mount, for example, having axes of rotation about the X-axis, Y-axis, and Z-axis. In contrast to an elastic suspension by connecting to the central suspension by means of springs, a corresponding gimbal suspension ensures defined and stable rotary motions about the corresponding axes of rotation.

The elastic gimbal suspension preferably comprises two rings connected to each other by means of torsional and anchor springs offset from each other. The torsional springs are preferably offset from each other by 90°, so that the two rings can also be rotated by 90° with respect to each other. Distinct rotary motions about one axis of rotation or another are thereby made possible.

If each X-Y sensor mass is connected to the outer ring of the gimbal suspension displaceably in the drive direction of the X-Y sensor mass but fixed with respect to motions of the X-Y sensor mass out of the X-Y plane, then the corresponding connected ring must always be displaceable together with the X-Y sensor mass, if said mass indicates a rate of rotation about the X-axis or Y-axis. Defined motions of the X-Y sensor mass are brought about by said support. The measurement results can thereby be maintained as correspondingly distinct and trouble-free.

In an advantageous embodiment of the invention, the X-Y sensor masses are connected to the Z sensor masses by means of springs, such that the Z sensor masses are largely stationary when an oscillating motion of the X-Y sensor masses occurs in the X-Y direction. When an oscillating rotary motion of the X-Y sensor masses occurs about the Z-axis, in contrast, the Z sensor masses oscillate substantially in the X-direction in the X-Y plane. The drive of the X-Y sensor masses thus brings about an oscillating rotary motion of the X-Y sensor masses about the Z-axis when a Coriolis force about the Z-axis occurs, and a motion of the Z sensor masses in the X-direction due to the corresponding connection of the X-Y sensor masses to the Z sensor masses. Said motion takes place due to springs and supports of the X-Y sensor masses and Z sensor masses, allowing the Z sensor masses to be displaced only in the X-direction and driven by the X-Y sensor masses when said masses rotate about the Z-axis. A motion of the X-Y sensor masses alone in the radial direction toward a center of the rate of rotation sensor leaves the Z sensor masses stationary in such an embodiment.

In another, alternative design of the drive of the X-Y sensor masses, such as not oscillating in antiphase toward and away from a center, but in phase in the positive X-direction and negative X-direction, the rate of rotation sensor can be designed such that the Z sensor masses are driven together with the X-Y sensor mass. The Z sensor masses thereby oscillate substantially in the X-direction. When a rate of rotation occurs about the Y-axis or the Z-axis, the Z sensor masses, in contrast, are not deflected together with the X-Y sensor masses.

In order to ensure uniform oscillation of the X-Y sensor masses, it is advantageous if synchronization springs are disposed between adjacent X-Y sensor masses. The synchronization springs compensate for slight drive deviations and cause the X-Y sensor masses to always oscillate uniformly.

Each of the X-Y sensor masses is preferably connected at least to a driving mass and to a Z-sensor mass by means of springs. The drive motion is transferred to the X-Y sensor mass by the driving masses and the spring connection. Rotary motions of the X-Y sensor mass about the Z-axis are transferred to the sensor mass by the spring connection of the X-Y sensor mass to the Z-sensor mass. As previously indicated, for a corresponding design of the springs and anchors and the drives of the X-Y sensor masses, the Z sensor masses can also be driven in the X-Y plane by the X-Y sensor mass by means of the spring connection.

In order to obtain a particularly stable system, it is advantageous if the driving masses and/or the Z sensor masses are each disposed by means of springs on at least one, preferably two anchors. The anchors are connected to the substrate and bring about stable support of the driving masses and/or the Z sensor masses. The displaceability of the driving masses and the Z sensor masses in the corresponding intended direction is ensured by the springs. In other directions, in which no motion or displaceability of the driving masses or Z sensor masses is to occur, the springs are correspondingly rigid. Support then takes place in turn at the corresponding anchors and the substrate. In order to bring about a stable and uniform drive of the X-Y sensor masses, it is advantageous if two driving masses or driving mass pairs are provided. The driving masses or driving mass pairs are actively driven by means of drive elements. This takes place, for example, by applying voltages to electrodes, thus driving the driving masses or driving mass pairs in a known, conventional manner.

In a particularly advantageous embodiment of the invention, the driving masses of a driving mass pairs are connected to each other by means of connecting elements or connecting structures. The connecting elements or connecting structures allow the driving mass pairs to be displaced identically. To a certain degree, they also serve to synchronize the driving masses, in order to be able to drive the X-Y sensor masses uniformly.

If the drive elements comprises electrodes for driving the driving masses, then a very space-saving and reliable drive system is produced. The electrodes drive the driving masses in a conventional manner.

If sensor elements are associated with the X-Y sensor masses and/or the Z sensor masses, then changes in the position of the X-Y sensor masses and/or Z sensor masses with respect to the substrate can be determined. Corresponding sensor elements, for example, are made of plate electrodes, wherein one electrode is fixed to the substrate and the other electrode is connected to the X-Y sensor mass or the Z-sensor mass. A change in spacing between the two electrodes facing each other, such as plate electrodes, generates electrical signals indicating a corresponding change in spacing. Said change in spacing and the electrical signals can allow conclusions about the corresponding rate of rotation of the rate of rotation sensor.

A method according to the invention serves for operating a micro rate of rotation sensor and for detecting a plurality of rates of rotation about orthogonal axes, having a substrate and driving masses, X-Y sensor masses, and Z sensor masses. The driving masses are driven to oscillate in the X-direction by drive elements. The X-Y sensor masses connected to the driving masses and correspondingly supported, are indirectly driven to oscillate in the X-Y direction, radial to a center, by the driving masses. When a rate of rotation of the substrate occurs about the X-axis or the Y-axis, the X-Y sensor masses are jointed deflected about the Y-axis or X-axis. When a rate of rotation of the substrate occurs about the Z-axis, the X-Y sensor masses are rotated about the Z-axis, and the Z sensor masses, which are correspondingly connected to the X-Y sensor masses and supported, are deflected substantially in the X-direction.

A substantial advantage of the invention is that the active driving takes place only in the X-direction by the drive elements. Corresponding drive means that require space are required only in conjunction with the drive elements. The drive elements are coupled to the X-Y sensor masses, such that a corresponding support of the X-Y sensor masses causes said masses to be driven not in the X-direction, but diagonally thereto in the X-Y direction. The X-Y sensor masses thus comprise drive vectors both in the X-direction and in the Y-direction. The X-Y sensor masses oscillate within the X-Y plane.

The separate drive of the drive elements reduces the space requirement and ensures that the rate of rotation sensor can be operated in a very trouble-free manner. The X-Y sensor masses are essential for detecting the rate of rotation and are decoupled from the drive devices, and thus do not transfer any interference to the system. Said masses can also be supported very stably, so that shock effects that can affect the rate of rotation sensor externally are superbly captured without mechanical or electrical damage.

If the X-Y sensor masses are driven to oscillate radially to a central suspension by the driving mass oscillating in the X-direction, then rates of rotation both about the X-axis and about the Y-axis and about the Z-axis can be detected. The micro rate of rotation sensor is thus a 3D sensor that can detect rates of rotation about three different, orthogonal axes.

The micro rate of rotation sensor according to the invention requires substantially less space, relative to the state of the art, which comprises three independent single rate of rotation sensors for detecting only one single rate of rotation each, for example. For other rate of rotation sensors according to the state of the art, which drive the sensor elements directly, such a high degree of insensitivity to interference typically cannot be achieved as for the present invention.

The present invention proposes a 3D rate of rotation sensor comprising a drive in one direction and a correspondingly coupled structure having a plurality of synchronously oscillating masses (X-Y sensor masses) in a plurality of directions. A single resonant frequency is thus guaranteed, allowing the system to be very stable in operation. A plurality of masses are separated by the functions thereof. It is thereby ensured that the system is operated in resonance by one type of mass, that a rate of rotation in the X-Y axis is detected by one type of mass, and that a rate of rotation out of the plane about the Z-axis is detected by a further type of mass. By dividing the functions among the individual masses, the mass geometry, the drive and detecting electrode positioning, and the drive motion amplitude are optimized. The dynamic stability of the system is thereby improved and sensitivity increased with respect to space requirements. Optimization of the drive motion is improved by the present invention by means of springs that can be positioned precisely at the correct location, in order to allow the desired oscillation and prevent other undesired resonances.

BRIEF DESCRIPTION OF THE DRAWINGS

Further advantages of the present invention are described in the following exemplary embodiments. Shown are.

DETAILED DESCRIPTION OF THE PREFERRED EMBODIMENTS

Figure 1:
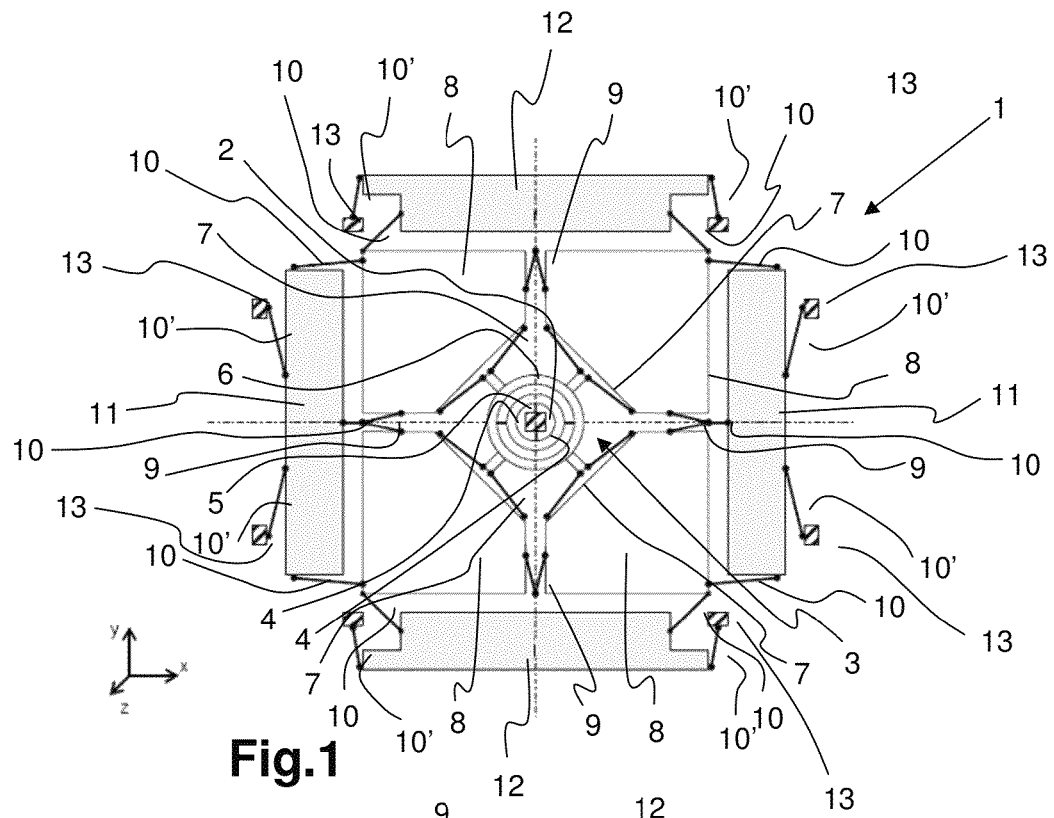
FIG. 1 a plan view of a schematic representation of the invention.

FIG. 1 shows a micro rate of rotation sensor 1 of the present invention in plain view, as a sketch. The sensor 1 is attached to a substrate beneath the sensor 1 by means of a central anchor 2. The sensor 1 is located at a slight distance in the Z-direction within the X-Y plane. A gimbal suspension 3 is disposed on the central anchor 2, by means of which the sensor 1 is rotationally displaceably suspended on the central anchor 2. The gimbal suspension 3 comprises anchor springs 4. Internal anchor springs 4 are aligned in the Y-direction and attach an inner ring 5 to the central anchor 2. Further anchor springs 4 aligned in the X-direction are disposed between the inner ring 5 and an outer ring 6. The anchor springs are torsional springs allowing rotation along the longitudinal axis thereof. The gimbal suspension 3 allows a rotary motion about the X-axis and about the Y-axis, due to the alignment of the corresponding anchor springs 4.

Connecting springs 7 are disposed on the outer ring 6, to which X-Y sensor masses 8 are attached. The connecting springs 7 are attached on the outer ring 6, centered between the X-axis and the Y-axis, and allow motion of the X-Y sensor masses in the X-Y direction. In the present exemplary embodiment, the X-Y direction is centered between the X-Y axis at a 45° angle to the same. The X-Y sensor masses are thereby able to be displaced in said 45° direction in oscillation in the radial direction to the central anchor 2. Other angle directions are, of course, also possible. The connecting springs 7 are designed such that motion out of the X-Y plane is prevented. This means that a motion of the X-Y sensor masses 8 out of the X-Y plane can take place only in connection with the outer ring 6 to which they are attached. Only if the outer ring 6 of the gimbal suspension 3 is displaced out of the X-Y plane are the X-Y sensor masses 8 also displaced out of said X-Y plane together with the outer ring 6.

In order to bring about synchronous motion of the X-Y sensor masses 8 in the radial direction to the central anchor 2, synchronization springs 9 are disposed between each two adjacent X-Y sensor masses 8. If the X-Y sensor masses 8 move away from the central anchor 2, then the synchronization springs 9 are extended. If the X-Y sensor masses 8 move back toward the central anchor 2, then the synchronization springs 9 are compressed. The extension and compression of the synchronization springs 9 is uniform, so that they ensure synchronous motion of the X-Y sensor masses 8 with respect to the central anchor 2.

A total of two driving masses 11 and two Z sensor masses 12 are attached to the X-Y sensor masses 8 by means of connecting springs 10. Each of the driving masses 11 and the Z sensor masses 12 is, in turn, attached to two anchors 13 by means of further connecting springs 10.

The driving masses 11 are displaceable substantially in the X-direction. In the present exemplary embodiment, they are further connected to the associated synchronization spring 9 facing the same by means of a connecting spring 10. The driving mass 1 further comprises drive elements, not shown, for example comb electrodes, of which one electrode is fixed to the substrate and the other electrode is connected to the driving mass 11. An applied alternating voltage causes the driving mass 11 to be driven to oscillate along the X-axis. The outer connecting springs 10' connecting the driving mass 11 to the anchors 13 are thereby implemented to be elastic within the X-Y plane. Said outer connecting spring 10' is not displaceable out of the X-Y plane. The driving mass 11 thus constantly remains in the X-Y plane.

The displacement of the driving mass 1 in the direction of the X-axis causes the associated X-Y sensor masses 8 to be set in motion together with the driving mass 11. The attachment of the X-Y sensor masses 8 to the driving mass 11 by means of the connecting springs 10 and the synchronizing springs 9 and to each adjacent X-Y sensor mass 8 and the Z-sensor mass 12 generates a motion of the X-Y sensor mass 8 within the X-Y plane. The direction of motion is at an angle of about 45° between the X-axis and the Y-axis, corresponding to the support of the X-Y sensor mass 8 in the present exemplary embodiment. The actively driven driving mass 11 thus drives the X-Y sensor mass 8 in the X-Y direction.

Two Z sensor masses 12 are provided between two driving masses 11 and parallel to the X-axis. The Z sensor masses 12 are connected to two adjacent X-Y sensor masses 8 by means of connecting springs 10. Each Z-sensor mass 12 is also connected to two anchors 13 by means of two outer connecting springs 10'. The outer connecting springs 10' allow motion of the Z-sensor mass substantially in the X-direction. Due to the design of the outer connecting spring 10', a slight motion in the Y-direction is to be expected. The substantial direction of motion, however, is in the direction of the X-axis. In any case, the Z-sensor mass also remains in the X-Y plane and does not move out of it.

Figure 2:
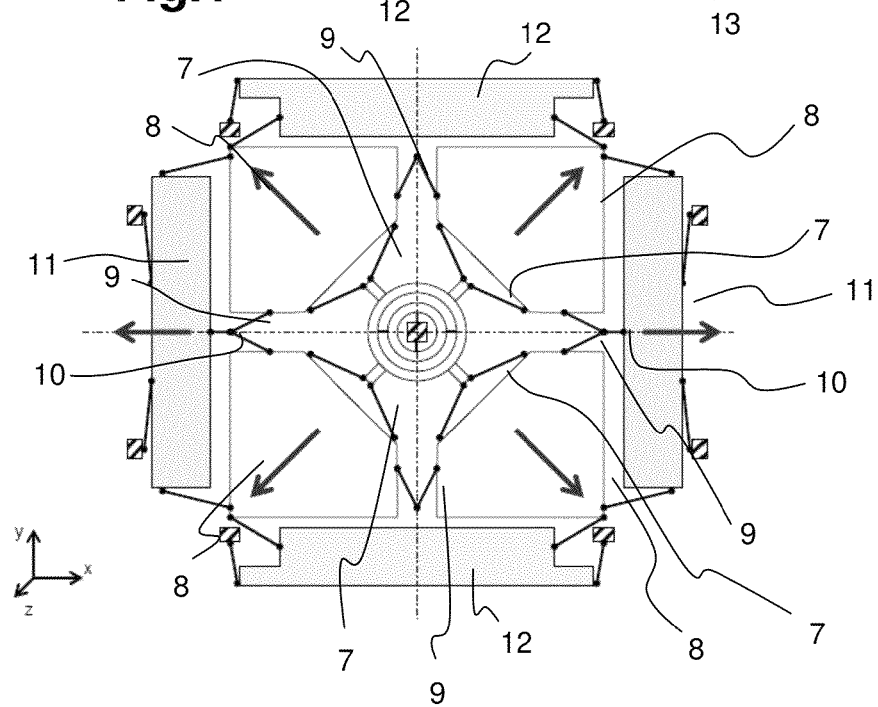
FIG. 2 the representation from FIG. 1 having corresponding drive motions.

The drive motion of the sensor 1 is shown in FIG. 2. From this figure, it can be seen that the driving masses 11 move along the X-axis in the direction of the arrow. This causes the connecting springs 10 and the synchronization springs 9 to move the X-Y sensor mass 8 as well. The X-Y sensor mass 8 is thus driven indirectly. Even if it is fundamentally possible for the X-Y sensor mass 8 to also comprise dedicated drive elements, such as comb electrodes, this is not provided in an advantageous embodiment of the invention. Only the driving masses 11 are advantageously actively driven.

As can be seen in the figure, the outer connecting springs 10' are contracted and the connecting springs 7 connecting the X-Y sensor masses 8 to the gimbal suspension 3 are extended. The X-Y sensor masses 8 move in a direction of about 45° from the X-axis and the Y-axis. By moving the driving masses 11 back and forth, the X-Y sensor masses 8 also move radially to the central anchor 2. The Z sensor masses 12 remain stationary. This applies to the case that the driving masses 11 move in antiphase. This means that they move simultaneously away from the central anchor 2 and back toward the same. In a different operating mode of the sensor 1, in contrast, it is also possible that the driving masses 11 move in phase. In this case, the Z sensor masses 12 move in the X-direction, together with the driving masses 11, even in a zero rate of rotation condition, while the X-Y sensor masses 8 further move in the 45° direction from the X-axis and the Y-axis. The motion of the X-Y sensor masses 8, however, is such that they move simultaneously to the left and then simultaneously to the right. Two X-Y sensor masses 8 are thus always moving toward the central anchor 2, while the two X-Y sensor masses 8 located opposite the Y-axis move away from said central anchor 2.

Figure 3:
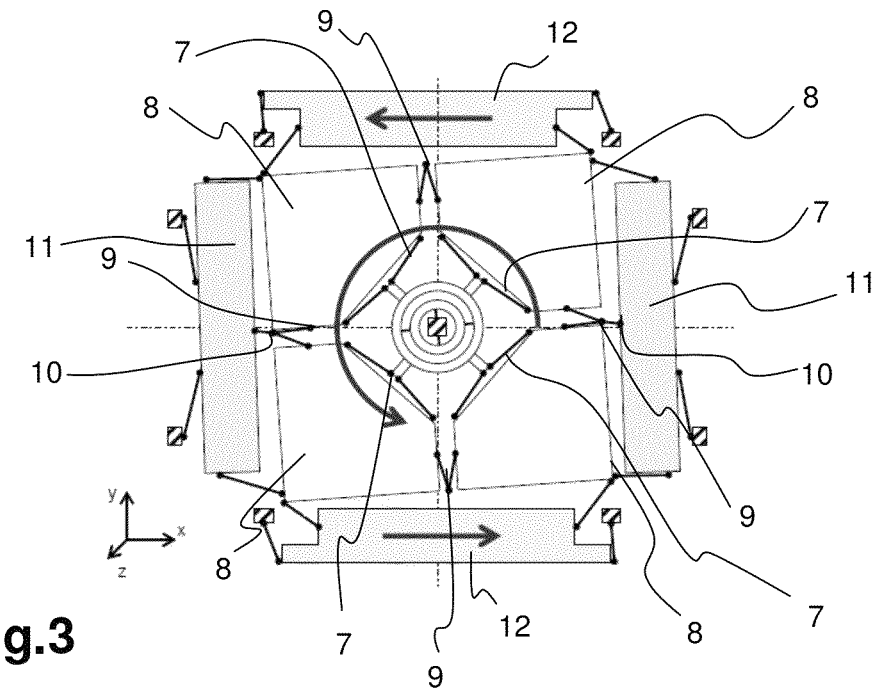
FIG. 3 the representation from FIG. 1 having a Z rate of rotation.

FIG. 3 shows a plan view of the exemplary embodiment from FIG. 1, while a Z rate of rotation is detected by the sensor 1. For the Z rate of rotation, the substrate of the sensor 1 rotates about the Z-axis. This causes the radially oscillating X-Y sensor masses to be deflected about the Z-axis. This takes place by a corresponding bending of the inner and outer anchor springs 4.

The connection of the X-Y sensor masses 8 to the Z sensor masses 12, by a corresponding rigidity of the connecting springs 10, causes the Z sensor masses 12 to be deflected substantially in the X-direction. Said deflection of the Z sensor masses 12 can change the distance thereof to each by means of sensor elements, not shown, such as electrodes, that are fixed to the substrate on one side and attached to the Z-sensor mass 12 on the other. Said changed electrical signal can be used for detecting the motion of the Z-sensor mass 12 in the X-direction, and thus for determining a Z rate of rotation. It would also be possible, of course, to detect the corresponding Z rate of rotation by means of sensors connected to the X-Y sensor mass 8 and the driving mass 11, because here as well a change in position takes place within the X-Y plane. The most unambiguous motion, however, is generated by means of the Z sensor masses 12, for which reason the detection can be done most simply and unambiguously by means of said Z sensor masses 12. The driving masses 12 and X-Y sensor masses 8 are also not burdened by corresponding sensor elements.

Figure 4:
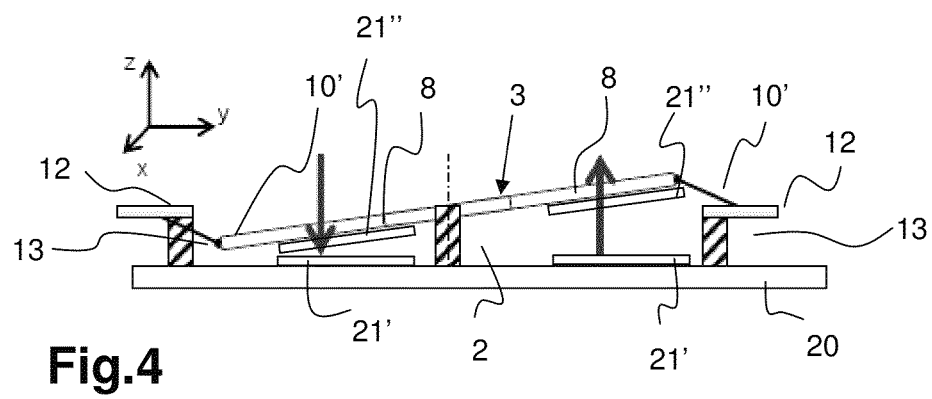
FIG. 4 a section through the representation from FIG. 1, having a motion of the X-Y sensor elements about the X-axis, FIG. 5 a section through the representation from FIG. 1 along the X-axis, having a deflection of the X-Y sensor elements about the Y-axis.

FIG. 4 shows a section along the Y-axis of the sensor 1 from FIG. 1. In the state shown here, the sensor 1 is detecting a rate of rotation about the Y-axis. When the sensor 1 or the substrate thereof rotates about the Y-axis, a Coriolis force acts on the X-Y sensor masses 8 due to the oscillating driving masses 11 and X-Y sensor masses 8, causing the X-Y sensor masses 8 to rotate about the X-axis. This is possible due to the gimbal suspension 3, wherein the outer ring 6 moves out of the X-Y plane with respect to the inner ring 5. The connecting springs 10 that connect the X-Y sensor masses 8 to the driving masses 11 and the Z-sensor mass 12 also extend and thus allow motion of the X-Y sensor masses 8 out of the X-Y plane.

Said tilting motion about the X-axis can be detected by means of sensor elements 21' and 21". The sensor element 21' is attached to the substrate 20, while the sensor element 21" is attached to the X-Y sensor mass 8. Tilting the X-Y sensor masses 8 about the X-axis changes the spacing of the sensor elements 21' and 21", whereby the electrical signal of said plate electrodes changes. The tilting motion about the X-axis can be detected thereby and a conclusion can be drawn about a rate of rotation about the Y-direction. As can be seen from the present representation, the Z sensor masses 12 do not move out of the original X-Y plane. Said masses remain in said X-Y plane due to the attachment thereof to the anchors 13 by means of the outer connecting springs 10'.

Figure 5:
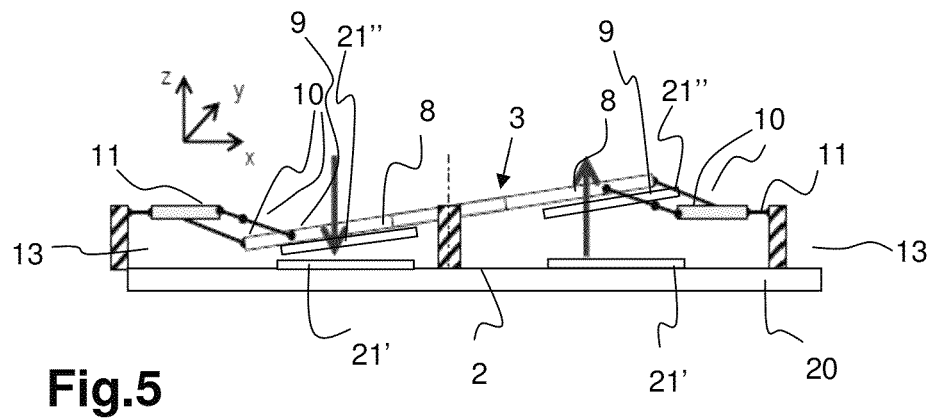

A section along the X-axis of the sensor 1 from FIG. 1 is also shown in FIG. 5, wherein a rate of rotation occurs about the X-axis. The rate of rotation about the X-axis causes the X-Y sensor masses 8 to tilt about Y-axis. The driving masses 11 remain in the X-Y plane, as do the Z sensor masses, not shown. Only the X-Y sensor masses 8 tilt about the central anchor 2 and the Y-axis, together with the gimbal suspension 3, that is, with the anchor springs 4 and the inner and outer ring 5, 6. Just as in the previous representation, here again the spacing of the two plate electrodes of the sensor elements 21' and 21" changes. This change can determine a rotation of the X-Y sensor masses 8 about the Y-axis and thus as an indicator for an X rate of rotation of the sensor 1. The synchronization springs 9 and the connecting springs 10 allow motion of the X-Y sensor masses 8 out of the X-Y plane. The connecting springs 10', in contrast, retain the driving mass 11 within the X-Y plane.

Figure 6:
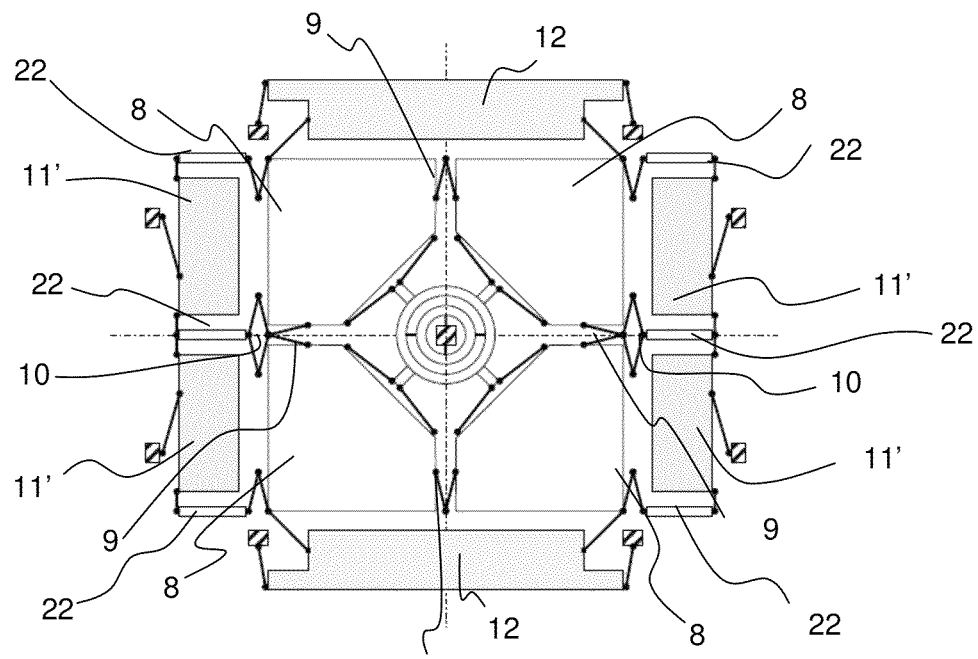
FIG. 6 a further embodiment of the invention in plan view.

A further exemplary embodiment is shown in FIG. 6. The driving mass is thereby shown as a pair of driving masses. Each pair of driving masses is made of two individual driving masses 11'. Each of the driving masses 11' is connected to an anchor 13. The connection between each individual driving mass 11' and the X-Y sensor masses 8 uses connecting structures 22. Said arrangement makes deflection of the X-Y sensor elements 8 even easier. The spring positions and the dynamics of the entire structure can thereby be further optimized. The functionality is otherwise identical to that previously described.

Figure 7:
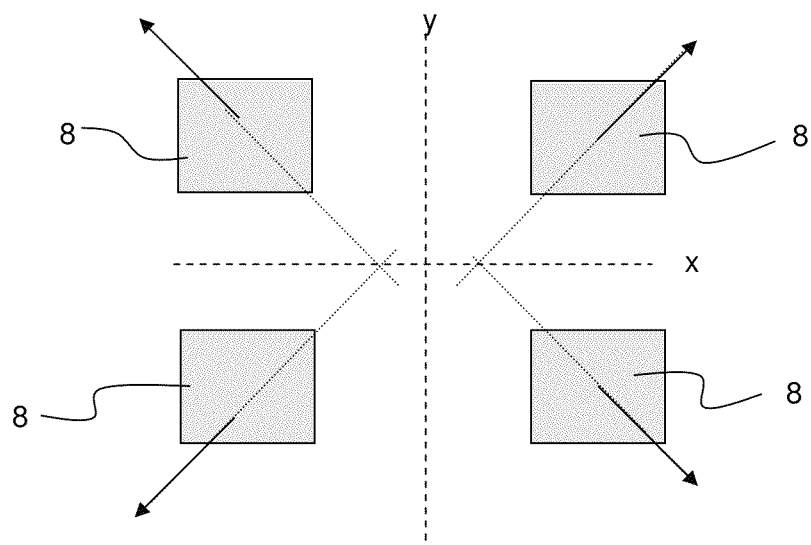
FIG. 7 a sketch of a further potential arrangement of the X-Y sensor elements.

FIG. 7 is a rough sketch of a further embodiment of the arrangement of X-Y sensor masses 8. Said representation is intended to clarify that the X-Y sensor masses 8 do not always have to be aligned to the origin of the X-axis, Y-axis, and Z-axis. The distances can also be increased, such that they approach each other outside of said center. The remaining structure is comparable to those of the previous figures.

Derivations of the present invention with respect to the exemplary embodiments shown are, of course, possible at any time. The gimbal suspension in particular is not required in all cases. A design of corresponding springs alone can also produce the connection of the X-Y sensor masses to one or even more anchors. The anchor 2 does not have to be disposed centrally at the origin of the X-axis, Y-axis, and Z-axis. It is thus also possible, for example, that each X-Y sensor mass 8 comprises a dedicated anchor that is not disposed at said center. The design of the driving masses 11 and the Z sensor masses 12 is also not confined to the sketches shown here. The same applies to the X-Y sensor masses 8. The distribution and arrangement of the outer anchors 13 can also be done in a manner other than as shown here. The designs can also be such that one anchor is used as an anchor for two adjacent driving masses 11 and Z sensor masses 12, to which the two masses are attached. Fine-tuning of the springs can be used to influence the amplitudes of the motions of the individual masses. The type of motion of the individual masses can, of course, also be influenced by the arrangement and coupling of the individual masses to the corresponding springs.

REFERENCE NUMERALS

1 Micro rate of rotation sensor
2 Central anchor
3 Gimbal suspension
4 Anchor spring
5 Inner ring
6 Outer ring
7 Connecting spring
8 X-Y sensor mass
9 Synchronizing spring
10 Connecting spring
11 Driving mass
12 Z-sensor mass
13 Outer anchor
20 Substrate
21 Sensor element

We claim:

1. A rotation sensor for detecting a plurality of rates of rotation about orthogonal axes (x,y,z), comprising:
a substrate;
a plurality of masses that are displaceable relative to the substrate and disposed in an X-Y plane parallel to the substrate;
a plurality of anchors for coupling the plurality of masses to the substrate;
springs to couple at least some of the plurality of masses to at least one adjacent mass or to at least one anchor;
drive elements for oscillating more than one of the plurality of masses in an X-direction, in order to generate Coriolis forces when the substrate is deflected;
sensor elements in order to detect deflections of the more than one of the plurality of masses due to the Coriolis forces generated; and
wherein the plurality of masses include driving masses, X-Y sensor masses. and Z sensor masses, the X-Y sensor masses being coupled to the driving masses and the Z sensor masses by means of springs, the X-Y sensor masses and the driving masses being coupled in such a manner that when the driving masses are driven to oscillate in the X-direction, the X-Y sensor masses are driven to oscillate in an X-Y direction by means of the driving masses.

2. The rotation sensor according to claim 1, wherein a drive direction of the X-Y sensor masses, the X-Y direction, is provided between the X-axis and the Y-axis in the X-Y plane at an angle of 45° to the X-axis.

3. The rotation sensor according to claim 1, wherein the X-Y sensor masses are disposed about a central suspension that includes at least one central anchor.

4. The rotation sensor according to claim 1, wherein the X-Y sensor masses are driven to oscillate radially or offset from a center by the driving masses oscillating in the X-direction.

5. The rotation sensor according to claim 3, wherein an elastic attachment configured as a gimbal suspension having axes of rotation about the X-axis, Y-axis, and Z-axis disposed between the X-Y sensor masses and the central suspension.

6. The rotation sensor according to claim 5, wherein the elastic gimbal suspension comprises two rings coupled to each other by means of torsional springs offset from each other.

7. The rotation sensor according to claim 6, wherein each X-Y sensor mass is displaceably coupled to a outer ring of the gimbal suspension in a drive direction of the X-Y sensor mass but not displaceably with respect to motions of the X-Y sensor mass out of the X-Y plane.

8. The rotation sensor according to claim 1, wherein the X-Y sensor masses are coupled to the Z sensor masses by means of springs, such that when an oscillating motion of the X-Y sensor masses occurs in the X-Y direction and about the Z-axis, the Z sensor masses oscillate in the X-Y plane substantially in the X-direction.

9. The rotation sensor according to claim 1, wherein the X-Y sensor masses are coupled to the Z sensor masses by means of springs, such that when an oscillating motion of the X-Y sensor masses occurs in the X-Y direction, the Z sensor masses are substantially stationary, and when an oscillating rotary motion of the X-Y sensor masses occurs about the Z-axis, the Z sensor masses oscillate substantially in the X-direction.

10. The rotation sensor according to claim 1, wherein synchronization springs are disposed between the X-Y sensor masses.

11. The rotation sensor according to claim 1, wherein each of the X-Y sensor masses is coupled to at least one driving mass and to one Z-sensor mass by means of springs.

12. The rotation sensor according to claim 1, wherein at least one of the driving masses and the Z sensor masses is disposed on at least one anchors by means of springs.

13. The rotation sensor according to claim 1, wherein two driving masses or pairs of driving masses are provided.

14. The rotation sensor according to claim 13, wherein the driving masses of a pair of driving masses are coupled to each other by means of connecting elements.

15. The rotation sensor according to claim 1, wherein the drive elements are electrodes for driving the driving masses.

16. The rotation sensor according to claim 1, wherein the sensor elements are associated with at least one of the X-Y sensor masses and the Z sensor masses.

17. A method for operating a rotation sensor for detecting a plurality of rates of rotation about orthogonal axes (x,y,z), comprising the steps of:
    arranging on a substrate driving masses, X-Y sensor masses, and Z sensor masses;
    driving the driving masses by drive elements to oscillate in an X-direction;
    driving the X-Y sensor masses to oscillate in the X-Y direction radially to a center by a connection to the driving masses; and
    sensing a response of at least one of X-Y and Z sensor masses according to a rate of rotation of the substrate, wherein when the rate of rotation of the substrate occurs about the X-axis or the Y-axis, the X-Y sensor masses are jointly deflected-about the Y-axis or X-axis, and when the rate of rotation of the substrate occurs about the Z-axis, the X-Y sensor masses are rotated about the Z-axis, and the Z sensor masses are deflected substantially in the X-direction.

18. The method according to claim 17, wherein the X-Y sensor masses are driven to oscillate radially to a central suspension by the driving masses oscillating in the X-direction.

* * * * *